United States Patent
Kim et al.

(10) Patent No.: US 9,904,116 B2
(45) Date of Patent: Feb. 27, 2018

(54) LCD DEVICE, MANUFACTURING METHOD THEREOF AND MASK THEREOF

(71) Applicant: Samsung Display Co., Ltd., Yongin (KR)

(72) Inventors: Kyung Bae Kim, Seoul (KR); Swae Hyun Kim, Asan-si (KR); Do Yeong Park, Seoul (KR); Seung Ho Yang, Hwaseong-si (KR); Jun Seok Lee, Seoul (KR); Chang Il Tae, Seoul (KR)

(73) Assignee: Samsung Display Co. Ltd., Yongin-si (KR)

( * ) Notice: Subject to any disclaimer, the term of this patent is extended or adjusted under 35 U.S.C. 154(b) by 269 days.

(21) Appl. No.: 14/695,278

(22) Filed: Apr. 24, 2015

(65) Prior Publication Data
US 2016/0195742 A1   Jul. 7, 2016

(30) Foreign Application Priority Data
Jan. 6, 2015   (KR) .................. 10-2015-0001194

(51) Int. Cl.
*G02F 1/13*     (2006.01)
*G02F 1/1337*   (2006.01)
*G02F 1/1333*   (2006.01)

(52) U.S. Cl.
CPC .. *G02F 1/133788* (2013.01); *G02F 1/133371* (2013.01); *G02F 2001/133761* (2013.01)

(58) Field of Classification Search
CPC ......... G02F 1/133788; G02F 1/133371; G02F 2001/133761
USPC ....................................................... 349/187
See application file for complete search history.

(56) References Cited

U.S. PATENT DOCUMENTS

| | | | |
|---|---|---|---|
| 2006/0290868 A1* | 12/2006 | Cho | G02F 1/134363 349/141 |
| 2012/0081644 A1* | 4/2012 | Jang | G02F 1/13718 349/108 |
| 2013/0128201 A1 | 5/2013 | Noma et al. | |
| 2013/0148075 A1* | 6/2013 | Sheu | G02F 1/1334 349/200 |
| 2014/0009914 A1* | 1/2014 | Cho | G09F 9/35 362/97.3 |

FOREIGN PATENT DOCUMENTS

| | | |
|---|---|---|
| KR | 10-2012-0131856 | 12/2012 |
| KR | 10-2014-0008730 | 1/2014 |
| KR | 10-2014-0017856 | 2/2014 |

OTHER PUBLICATIONS

Machine translation of Hiroshi Fujimura et al (JP 2004-354468A).*
Machine translation of Yoshida, Tokuo (JP 59-140422).*

* cited by examiner

*Primary Examiner* — Lucy Chen
(74) *Attorney, Agent, or Firm* — H.C. Park & Associates, PLC

(57) ABSTRACT

A method of manufacturing a liquid crystal display (LCD) device includes preparing a display panel including a first substrate, a second substrate facing the first substrate, and a liquid crystal layer interposed between the first and second substrates, pretilting liquid crystal molecules in the liquid crystal layer, and molding the display panel into a curved shape having a first curvature, in which the liquid crystal molecules are pretilted according to a gap interposed between the first and second substrates that overlap the liquid crystal layer.

19 Claims, 9 Drawing Sheets

LCD DEVICE, MANUFACTURING METHOD THEREOF AND MASK THEREOF

CROSS-REFERENCE TO RELATED APPLICATION

This application claims priority from and the benefit of Korean Patent Application No. 10-2015-0001194, filed on Jan. 6, 2015, which is hereby incorporated by reference for all purposes as if fully set forth herein.

BACKGROUND

Field

Exemplary embodiments of the present invention relate to a curved liquid crystal display (LCD) display device, a manufacturing method thereof, and a mask thereof.

Discussion of the Background

A liquid crystal display (LCD) device may include first and second substrates provided with field generating electrodes such as a pixel electrode and a common electrode, and a liquid crystal layer interposed therebetween. The LCD device may generate an electric field in the liquid crystal layer by applying a voltage to the field-generating electrodes, and display an image by determining the alignment orientation of liquid crystal molecules in the liquid crystal layer and controlling the polarization of incident light. LCD devices may be display devices for television (TV) receivers, so the size of the display devices may be increased accordingly. As the size of LCD display devices increases, differences in views may occur when a center area of the display device is viewed and when a left or right end side of the display device is viewed.

To compensate for differences in views, a curved display device may be formed by curving the display device in a concave type or convex type. The curved display device may be a portrait type where a vertical length is larger than a horizontal length and the display device is curved along a vertical direction, or a landscape type where a vertical length is smaller than a horizontal length and the display device is curved along a horizontal direction. A curved LCD device may be formed by applying force to the rim of first and second substrates laminated together to bend the first and second substrates. However, the deformation force applied to the inside of a curved surface of the curved LCD device may differ from the deformation force applied to the outside of the curved surface, and as a result, the first and second substrates may not be uniformly curved. When the first and second substrates are non-uniformly curved, the gap between the first and second substrates, i.e., the cell gap of the curved LCD device, may become irregular. In this case, the properties of the display panel of the curved LCD device may deteriorate, and particularly, the response speed of the liquid crystal molecules in the curved LCD device may decrease. Accordingly, the display quality of the curved LCD device may be lowered.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a curved liquid crystal display (LCD) device that may prevent deterioration of display quality caused by irregularity in the cell gap thereof.

Exemplary embodiments of the present invention also provide a manufacturing method of a curved LCD device that may prevent deterioration of display quality caused by irregularity in the cell gap thereof.

Exemplary embodiments of the present invention also provide a mask of a curved LCD device that may prevent deterioration of display quality by irregularity in the cell gap thereof.

Additional aspects will be set forth in the detailed description which follows, and, in part, will be apparent from the disclosure, or may be learned by practice of the inventive concept.

According to an exemplary embodiment of the present invention, a method of manufacturing a liquid crystal display (LCD) device includes preparing a display panel including a first substrate, a second substrate facing the first substrate, and a liquid crystal layer interposed between the first and second substrates, pretilting liquid crystal molecules in the liquid crystal layer, and molding the display panel into a curved shape having a first curvature, in which the liquid crystal molecules are pretilted according to a gap interposed between the first and second substrates that overlaps the liquid crystal layer.

The liquid crystal layer may include an ultraviolet (UV)-curable monomer, the ultraviolet (UV)-curable monomer being cured to pretilt the liquid crystal molecules by applying UV light from an external source.

Pretilting the liquid crystal molecules may include applying a pretilt voltage to the display panel, disposing a mask over the display panel, and selectively applying UV light to the display panel from above the mask by controlling the amount of UV light transmitted through each part of the mask.

The amount of UV light transmitted through each portion of the mask may be controlled by adjusting an electric field applied in each portion of the mask.

An inclination angle of the pretilted liquid crystal molecules may be proportional to the gap interposed between the first and second substrates that overlaps the liquid crystal layer.

Preparing the display panel my include bonding the first substrate to the second substrate using a sealing member, and injecting the liquid crystal layer between the first and second substrates.

Molding the display panel may include loading the display panel on a seating surface of a lower jig having the first curvature, and bending the display panel using a bottom surface of an upper jig having the first curvature.

The upper jig may includes at least one heater for heating the display panel, and the lower jig may include at least one blast pipe for dissipating heat from the display panel.

According to an exemplary embodiment of the present invention, a liquid crystal display (LCD) device mask includes a first substrate, a second substrate facing the first substrate, a liquid crystal layer interposed between the first and second substrates, first electrodes disposed on a first surface of the first substrate, and second electrodes disposed on a second surface of the second substrate to face the first electrodes, in which the first electrodes extend in a first direction and the second electrodes extend in a second direction intersecting the first direction.

An alignment of liquid crystal molecules in the liquid crystal layer may be configured to vary according to a voltage at each intersection of the first electrodes and the second electrodes.

The amount of light incident upon the first substrate and emitted through the second substrate may be configured to vary according to a voltage of the first electrodes and a voltage of the second electrodes.

The second substrate may be configured to transmit UV light incident to a display panel, the display panel may include liquid crystal molecules in a liquid crystal layer of a display panel, and the liquid crystal molecules of the display device may be configured to be pretilted according to the amount of UV light applied to the display panel.

The display panel may be bent to have a first curvature, a first area, and a second area, the second substrate of the mask may be configured to transmit a first amount of UV light and a second amount of UV light to pretilt the liquid crystal molecules in the first and second areas of the display panel, respectively, and the first area may include a first cell gap and the second area may include a second cell gap due to bending of display panel.

The mask may further include a first polarizing plate disposed on a second surface of the first substrate, and a second polarizing plate disposed on a first surface of the second substrate, in which a transmission axis of the first polarizing plate is opposite to a transmission axis of the second polarizing plate.

According to an exemplary embodiment of the present invention, a liquid crystal display (LCD) device includes a first substrate, a second substrate facing the first substrate, and a liquid crystal layer interposed between the first and second substrates, in which the first and second substrates are bent to have substantially the same radius of curvature with each other, and the liquid crystal layer includes liquid crystal molecules that are pretilted according to a gap between the first and second substrates that overlap the liquid crystal layer.

An inclination angle of the pretilted liquid crystal molecules may be proportional to the gap between the first and second substrates that overlap the liquid crystal layer.

An inclination angle of the liquid crystal molecules with respect to a vertical axis may increase as the gap between the first and second substrates that overlap the liquid crystal layer may increase.

The first substrate may be disposed on an inside of the center of a radius of curvature thereof.

The LCD device may further include a light source unit bent to have the same radius of curvature as the second substrate and configured to emit light toward the second substrate.

The LCD device may further include a light source reinforcing member bent to have the same radius of curvature as the second substrate and disposed between the light source unit and the second substrate.

According to the exemplary embodiments of the present invention, the response speed of liquid crystal molecules in a liquid crystal layer may be improved by controlling a pretilt angle of the liquid crystal molecules according to the cell gap of a curved LCD device to improve display quality.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
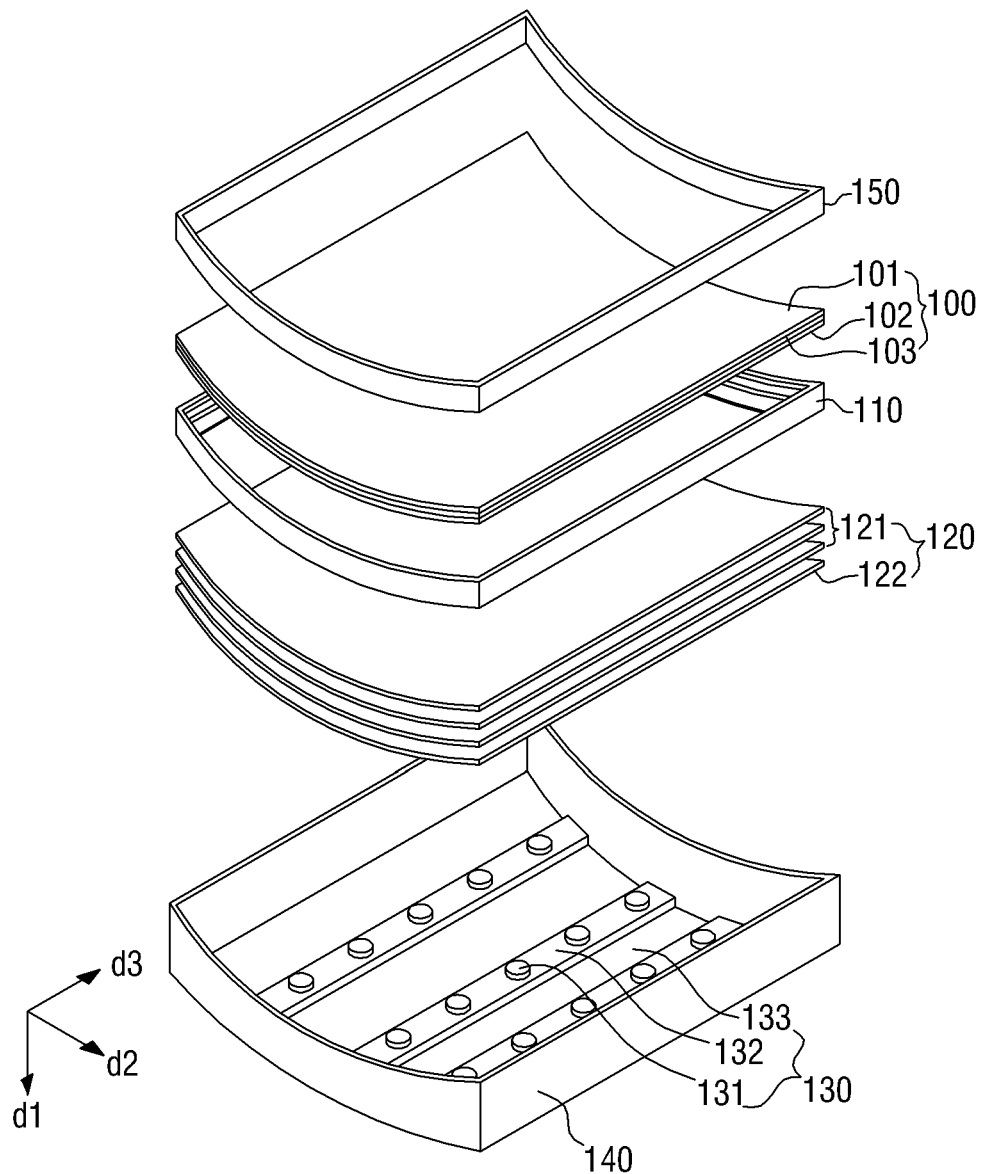
FIG. 1 is an exploded perspective view of a liquid crystal display (LCD) device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
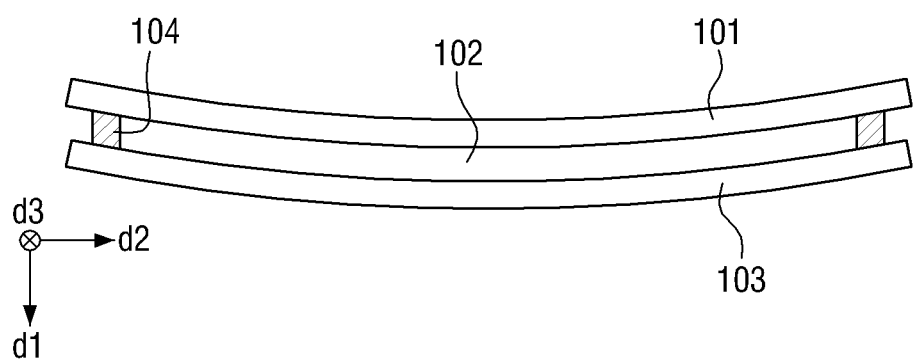
FIG. 2 is a cross-sectional view of a display panel illustrated in FIG. 1.

FIG. 1 is an exploded perspective view of a liquid crystal display (LCD) device according to an exemplary embodiment of the present invention, and FIG. 2 is a cross-sectional view of a display panel illustrated in FIG. 1.

Referring to FIGS. 1 and 2, an LCD device 10 includes a display panel 100, a mold frame 110, a light source reinforcing member 120, a light source unit 130, a bottom chassis 140, and a top chassis 150.

The display panel 100, which is a panel that displays an image, may include a first substrate 101, a second substrate 103, and a liquid crystal layer 102 disposed between the first and second substrates 101 and 103. A sealing member 104 is disposed along the boundaries of the first and second substrates 101 and 103. The first and second substrates 101 and 103 may be coupled together by the sealing member 104, and the sealing member 104 may seal the liquid crystal layer 102 in a gap formed between the first and second substrates 101 and 103. The first and second substrates 101 and 103 may be transparent substrates. The first and second substrates 101 and 103 may be formed of a soft material.

The first and second substrates 101 and 103 may be bent to have a uniform curvature. In particular, the LCD device 10 may be a curved display device. A user of the LCD device 10 may view a concavely curved part of the LCD device 10 in a horizontal direction (or a direction from the left side to the right side of the user). More particularly, the user may face the first substrate 101 side of the LCD device 10. The first and second substrates 101 and 103 may be bent to have a uniform curvature radius. The center of the curvature radius of the first and second substrates 101 and 103 in the horizontal direction may be located outside the first substrate 101, i.e., at a place where the user is located. The LCD device 10 may also include a fixing member (not illustrated), which fixes the first and second substrates 101 and 103 to have a uniform curvature.

The second substrate 103 may be an array substrate, and the first substrate 101 may be an encapsulation substrate. Signal lines such as gate lines and data lines, switching devices such as thin-film transistors (TFTs) connected to the signal lines, and first field-generating electrodes connected to the switching devices may be formed on the second substrate 103. A light-shielding member, color filters, and second field-generating electrodes may be formed on the first substrate 101. Alternatively, the first field-generating electrodes and the second field-generating electrodes may both be formed on the second substrate 103. At least one of the light-shielding member and the color filters may also be formed on the second substrate 103.

The liquid crystal layer 102 injected between the first and second substrates 101 and 103 may include liquid crystal layers, such as liquid crystal layers of a twisted nematic (TN) mode, a vertical aligned (VA) mode, an in-plane switching (IPS) mode, and a blue phase (BP) mode. At least one of the first and second substrates 101 and 103 may include an alignment layer (not illustrated), and the alignment layer may be rubbed or optically aligned in a predetermined direction. Alternatively, at least one of the liquid crystal layer 102 and the alignment layer may include a photopolymer material. The voltage applied to the liquid crystal layer 102 may vary according to an electric field generated between the first field-generating electrodes and the second field-generating electrodes. The alignment orientation of liquid crystal molecules LC in the liquid crystal layer 102 may vary according to the voltage applied to the liquid crystal layer 102. The second substrate 103 may control the voltage generated in the liquid crystal layer 102 to control the path and amount of light incident upon and emitted from the liquid crystal layer 102.

The sealing member 104 may have a width of about 2.0 mm. The sealing member 104 may include a resin, an initiator, and a filler. The resin may include at least one of an acrylic resin, an epoxy resin, and urethane resin. The initiator may include at least one of an optical initiator, which absorbs visible light or ultraviolet (UV) light, and a thermal initiator, which reacts with heat. For example, the optical initiator may be an initiator that may absorb light within a visible wavelength range of 400 nm or higher, and may be an oxime-based material. The filler may include core-sell particles or an inorganic plate-shaped filler.

The light source unit 130 may be disposed below the display panel 100, and provide light to the display panel 100. The light source unit 130 may be of a direct type, as illustrated in FIG. 1. Alternatively, the light source unit 130 may be of an edge type. The light source reinforcing member 120 may be disposed between the light source unit 130 and the display panel 100. The light source reinforcing member 120 may improve the efficiency of light provided by the light source unit 130 and provide the light to the display panel 100.

The light source unit 130 may include printed circuit boards (PCBs) 131, light sources 132 respectively disposed on the PCBs 131, and a reflective plate 133. The PCBs 131 may have the light sources 132, respectively, mounted thereon. The light sources 132 may be respectively mounted on the PCBs 131, and emit light. The reflective plate 133 may be disposed below the PCBs 131, and reflect light emitted from below the PCBs 131 back to the PCBs 131.

The light source reinforcing member 120 may include optical sheets 121 and a diffusion sheet 122. The diffusion sheet 122 may be disposed between the light source unit 130 and the optical sheets 121. The diffusion sheet 122 may diffuse light provided by the light source unit 130 and provide the diffused light to the optical sheets 121. The optical sheets 121 may improve the efficiency of the diffused light and provide the diffused light to the display panel 100.

The light source unit 130 and the light source reinforcing member 120 may be bent to have the same curvature as the display panel 100. More particularly, the optical sheets 121, the diffusion sheet 122, the PCBs 131, and the reflective plate 133 may have the same curvature as the first and second substrates 101 and 103.

The mold frame 110, the bottom chassis 140, and the top chassis 150 may be fixing members. The mold frame 110 may fix the display panel 100 so that the display panel 100 may be curved with a uniform curvature radius. The bottom chassis 140 may receive the display panel 100, the light source reinforcing member 120, and the light source unit 130 therein. A bottom surface of the bottom chassis 140 may be bent to have a uniform curvature radius so as to accommodate the light source unit 130 thereon. The top chassis 150 may also be bent to have a uniform curvature radius, and connected to the bottom chassis 140 so as to fix the display panel 100, the light source reinforcing member 120, and the light source unit 130.

Types of variations on the first and second substrates 101 and 103 during the bending of the LCD device 10 will hereinafter be described.

Figure 3:
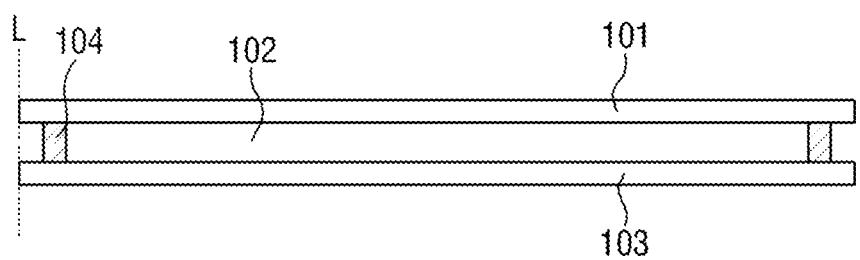
FIGS. 3 and 4 are cross-sectional views of a display panel when bending a typical LCD device.
Figure 4:
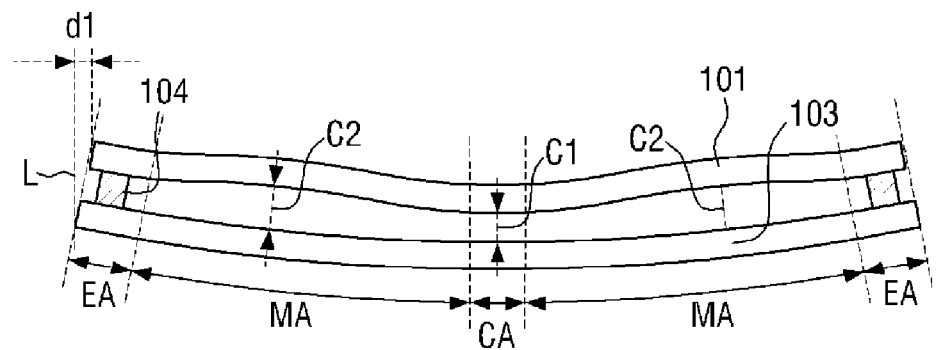
Figure 5:
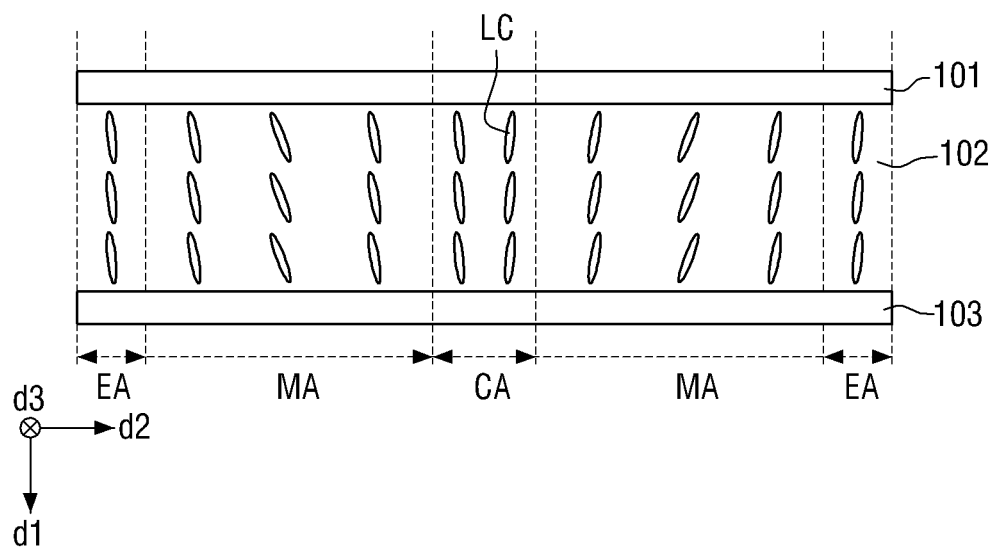
FIG. 5 is a cross-sectional view illustrating liquid crystal molecules in a liquid crystal layer illustrated in FIG. 1.

FIGS. 3 and 4 are cross-sectional views illustrating variations of substrates when bending a display device. The display device in FIG. 3 and FIG. 4 may be a general LCD device according to a comparative embodiment, and constituting elements of the display device illustrated in FIGS. 3 and 4 may have the same reference numerals as those of the LCD device 10 for convenience of description. FIG. 5 is a cross-sectional view illustrating liquid crystal molecules in a liquid crystal layer illustrated in FIG. 1.

Referring to FIGS. 3 and 4, the display device may include first and second substrates 101 and 103 facing each other, and a sealing member 104 that couples the first and second substrates 101 and 103 together. The first and second substrates 101 and 103 coupled together by the sealing member 104 have a flat surface, as illustrated in FIG. 3. The first and second substrates 101 and 103 are arranged such that their surfaces are perpendicular to an imaginary vertical line L.

Referring to FIG. 4, the display device may be bent. More particularly, the first and second substrates 101 and 103 may be bent to have substantially the same curvature radius. The first and second substrates 101 and 103 may be fixed such that relative locations of the first and second substrates 101 and 103 with respect to the sealing member 104 may remain fixed. Accordingly, when the first and second substrates 101 and 103 that are fixed are bent, tensile force may be applied to the second substrate 103, which is located on the outside of the center of the curvature radius of the bent display device, and compressive force is applied to the first substrate 101, which is located on the inside of the center of the curvature radius of the bent display device. Accordingly, as illustrated in FIG. 4, the edge of the first substrate 101 may be shorter than the edge of the second substrate 103 by a first distance d1 with respect to the imaginary vertical line L. More particularly, the first substrate 101, which is located on the inside of the center of the curvature radius of the bent display device, may be compressed in a horizontal direction, as compared to the second substrate 103, which is located on the outside of the center of the curvature radius of the bent display device. In this case, due to the compressive force applied to the first substrate 101, the gap between the first and second substrates 101 and 103, i.e., the cell gap of the bent display device, may become irregular. In particular, parts of the bent display device may have a second cell gap C2 that is greater than a first cell gap C1 located at the center of the bent display device.

As illustrated in FIG. 4, a narrow cell gap may be formed between the first substrate 101 and the second substrate 103 at an end portion EA of the display panel 100, due to the compressive force exerted by the sealing member 104 and the compressive force applied to the first substrate 101. The end portion EA of the display panel 100 may be a boundary portion of the display panel 100 along which the sealing member 104 is provided. A central portion CA of the display panel 100 may be an area defined by an imaginary line that divides the display panel 100 in half in a vertical direction (or a top-to-bottom direction with respect to the user). A large cell gap may be formed in a middle portion MA of the display panel 100 arranged between the end portion EA and the central portion CA of the display panel 100. Such cell gap differences between areas of the display panel 100 may result in differences in the response speed of the liquid crystal molecules LC between different areas of the display panel 100. In particular, the response speed of the liquid crystal molecules LC may decrease in an area where a large cell gap is formed, and increase in an area where a narrow cell gap is formed. More particularly, the amount of light displayed may vary from one area to another area of the display panel 100 for the same data voltage applied.

Referring to FIG. 5, according to an exemplary embodiment of the present invention, a pretilt angle of the liquid crystal molecules LC in the liquid crystal layer 102 of the LCD device 10 may vary according to the cell gap in each area of the LCD device 10. The liquid crystal layer 102 may include the liquid crystal molecules LC, which are pretilted according to the gap between the first and second substrates 101 and 103 that overlap the liquid crystal layer 102. The liquid crystal molecules LC may be pretilted at a large angle in an area where a large cell gap is formed. The liquid crystal molecules LC may be pretilted at a small angle in an area where a narrow cell gap is formed. The pretilt angle of the liquid crystal molecules LC may indicate the degree to which the liquid crystal molecules LC are tilted with respect to a vertical axis.

The liquid crystal molecules LC of the liquid crystal layer 102 according to an exemplary embodiment of the present invention may have different pretilt angles in different areas of the display panel 100. The liquid crystal layer 102 may include an alignment adjuvant, which adjusts the alignment of the liquid crystal molecules LC according to the amount of UV light applied. The pretilt angle of the liquid crystal molecules LC may vary according to the amount of UV light applied. The pretilted liquid crystal molecules LC may respond more quickly to a voltage generated in the liquid crystal layer 102. The greater the pretilt angle of the liquid crystal molecules LC, the faster the response speed of the liquid crystal molecules LC may be. The pretilt angle of the liquid crystal molecules LC may be determined in consideration of the location of distribution of the liquid crystal molecules LC. Cell gap variations in the display panel 100 resulting from the bending of the display panel 100 with a predetermined curvature radius may be experimentally calculated, and the liquid crystal molecules LC may be configured to have different pretilt angles in different areas in consideration of the calculated cell gap variations in the display panel 100. As illustrated in FIG. 5, the liquid crystal molecules LC may not substantially be pretilted in a central portion CA and end portions EA of the display panel 100 where a narrow cell gap is formed. The liquid crystal molecules LC may be pretilted at a largest angle in an area where a largest cell gap is formed when the display panel 100 is bent. The pretilt angle of the liquid crystal molecules LC with respect to a horizontal direction (or a second direction d2) may be set to vary from one area to another area of the display panel 100. The cell gap of the display panel 100 may vary not only in the second direction d2, but also in a third direction d3, which intersects the second direction d2. Therefore, the pretilt angle of the liquid crystal molecules LC may be set to vary according to the variation of the cell gap of the display panel 100 in the third direction d3. In particular, the liquid crystal molecules LC may be pretilted in proportion to the cell gap of the display panel 100, which overlaps the liquid crystal layer 102.

In the LCD device 10 according to an exemplary embodiment of the present invention, the liquid crystal molecules LC are pretilted in consideration of the cell gap variations in the display panel 100. Accordingly, the LCD device 10 may prevent the response speed of the liquid crystal molecules LC from being lowered due to a variation in the cell gap of the display panel 100, and thus prevent deterioration of display quality of the LCD device 10.

A mask of an LCD device, according to an exemplary embodiment of the present invention, will hereinafter be described.

Figure 6:
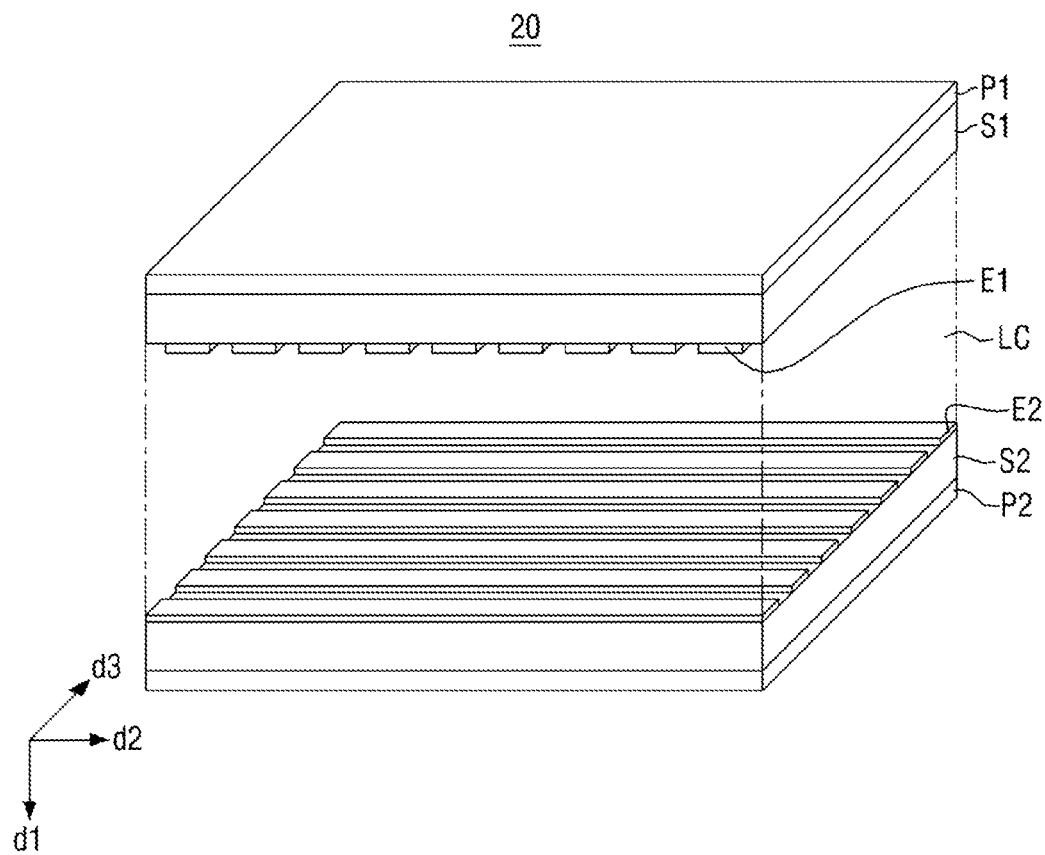
FIG. 6 is a perspective view of a mask of an LCD device, according to an exemplary embodiment of the present invention.
Figure 7:
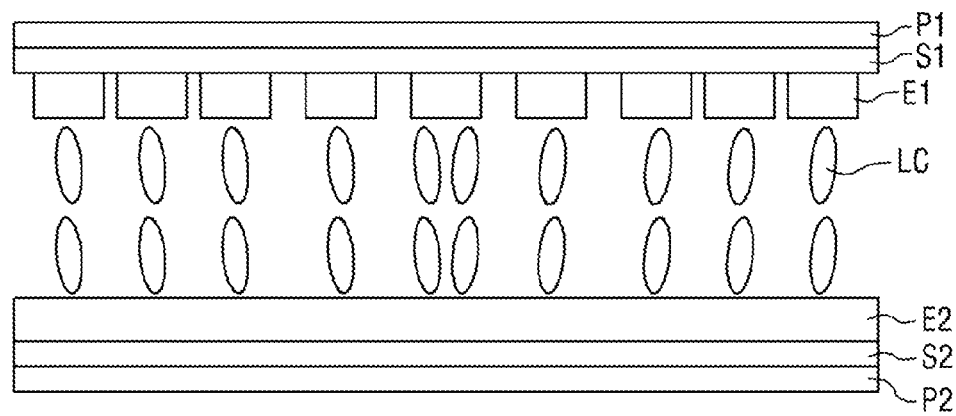
FIG. 7 is a cross-sectional view of the mask illustrated in FIG. 6.
Figure 8:
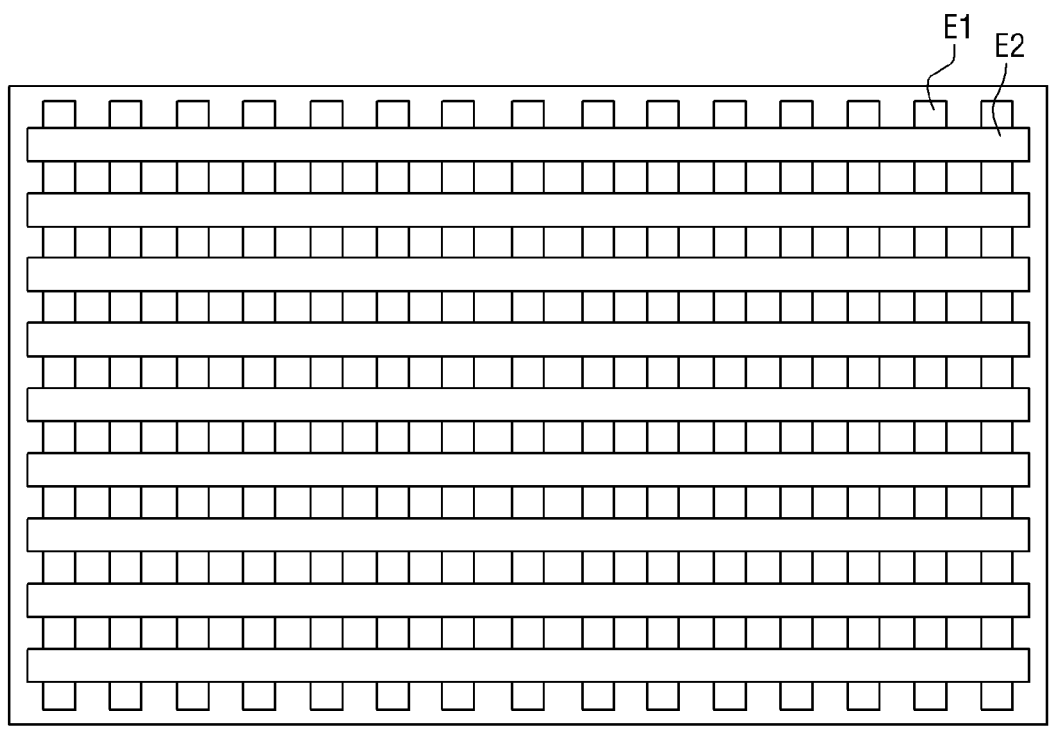
FIG. 8 is a plan view illustrating the relationship between first electrodes and second electrodes illustrated in FIG. 6.
Figure 9:
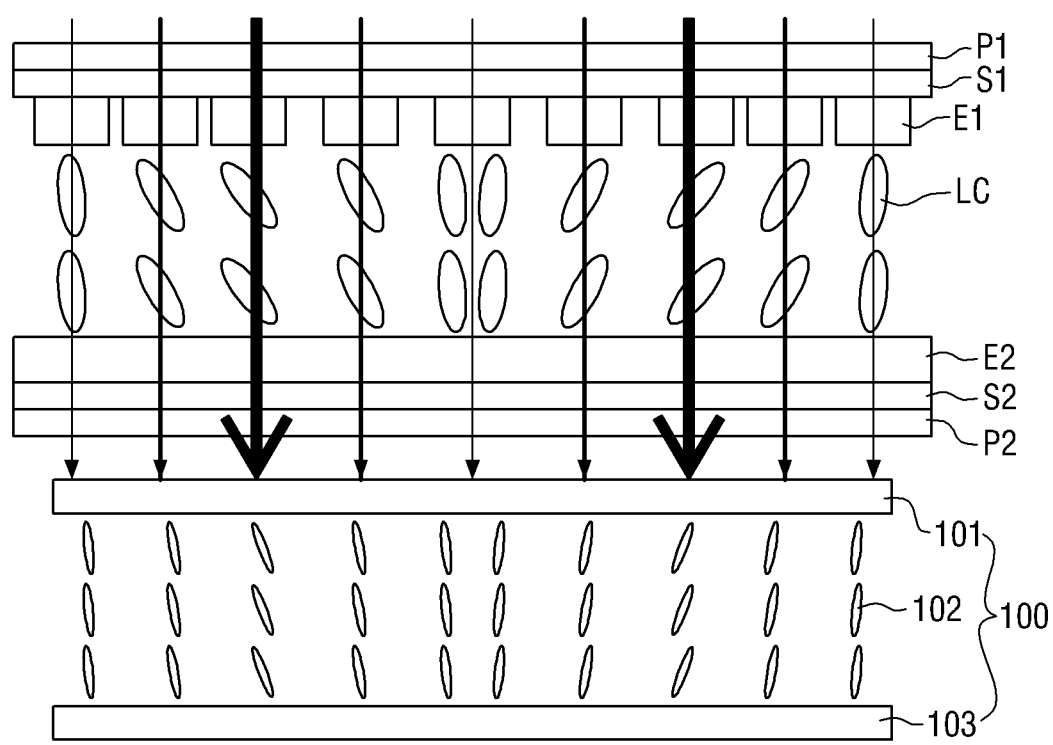
FIG. 9 is a cross-sectional view illustrating the relationship between the LCD device illustrated in FIG. 1 and the mask illustrated in FIG. 6.

FIG. 6 is a perspective view of a mask of an LCD device, according to an exemplary embodiment of the present invention. FIG. 7 is a cross-sectional view of the mask illustrated in FIG. 6. FIG. 8 is a plan view illustrating the relationship between first electrodes and second electrodes illustrated in FIG. 6. FIG. 9 is a cross-sectional view illustrating the relationship between the LCD device illustrated in FIG. 1 and the mask illustrated in FIG. 6.

Referring to FIGS. 6 to 9, a mask 20 includes a first substrate S1, a second substrate S2, first electrodes E1, second electrodes E2, a first polarizing plate P1, a second polarizing plate P2, and a liquid crystal layer LC.

The mask 20 may be a liquid crystal panel. More specifically, the mask 20 may adjust the alignment of liquid crystal molecules and control the amount of light transmitted therethrough. The liquid crystal layer LC may be interposed between the first and second substrates S1 and S2. The first electrodes E1 may be disposed on a first surface of the first substrate S1 facing the second substrate S2, and the second polarizing plate P1 may be disposed on a second surface of the first substrate S1. The second electrodes E2 may be disposed on a second surface of the second substrate S2 facing the first substrate S1, and the second polarizing plate P2 may be disposed on a first surface of the second substrate S2. The transmission axis of the first polarizing plate P1 may be opposite to the transmission axis of the second polarizing plate P2. The transmission axis of the first polarizing plate P1 may be orthogonal to the transmission axis of the second polarizing plate P2. In particular, linearly polarized light transmitted through the first polarizing plate P1 may not pass through the second polarizing plate P2. However, as the alignment of the liquid crystal molecules in the liquid crystal layer LC changes, the linearly polarized light from the first polarizing plate P1 may be linearly polarized again, and pass through the second polarizing plate P2. More particularly, the amount of light transmitted through the mask 20 may be adjusted according to the variation of the alignment of the liquid crystal molecules in the liquid crystal layer LC. The alignment of the liquid crystal molecules in the liquid crystal layer LC may be determined by a difference between the voltage of the first electrodes E1 and the voltage of the second electrodes E2.

More than one first electrode E1 may be provided, and the first electrodes E1 may be arranged side-by-side on the first surface of the first substrate S1 along a first direction d1. More than one second electrode E2 may be provided, and the second electrodes E2 may be arranged side-by-side on the second surface of the second substrate S2 along a second direction d2, which is perpendicular to the first direction d1. More particularly, as illustrated in FIG. 8, the first electrodes E1 and the second electrodes E2 may intersect each other. An electric field with a predetermined level may be formed at each of the intersections between the first electrodes E1 and the second electrodes E2, and the alignment of the liquid crystal molecules in the liquid crystal layer LC, which is disposed between the first electrodes E1 and the second electrodes E2, may vary according to the electric field. The voltage applied to each of the first electrodes E1 and the voltage applied to each of the second electrodes E2 may be controlled separately. Accordingly, by controlling the voltage applied to each of the first electrodes E1 and the voltage applied to each of the second electrodes E2, the level of the electric field at each of the intersections between the first electrodes El and the second electrodes E2 may be controlled. More particularly, the mask 20 may control the alignment of the liquid crystal molecules at each of the intersections between the first electrodes E1 and the second electrodes E2. The number of, and the interval between, first electrodes E1 and the cross-sectional area of the first electrodes E1 may vary depending on the type of target to be controlled. The number of, and the interval between, second electrodes E2 and the cross-sectional area of the second electrodes E2 may also vary depending on the type of target to be controlled.

The mask 20 may selectively provide an amount of light applied thereto from thereabove to therebelow. More particularly, the amount of light incident upon the first substrate S1 and then emitted through the second substrate S2 may be adjusted by controlling the voltage of the first electrodes E1 and the voltage of the second electrodes E2.

According to an exemplary embodiment of the present invention, the mask 20 may control the amount of UV light applied to pretilt the liquid crystal molecules of the display panel 100. The liquid crystal layer 102 of the display panel 100 may include an alignment adjuvant, which adjusts the alignment of liquid crystal molecules according to the amount of UV light applied. More particularly, the greater the amount of UV light applied to the liquid crystal layer 102, the greater the degree to which the liquid crystal molecules LC of the liquid crystal layer 102 may be pretilted. The mask 20 may be formed to have the same size as the display panel 100. Pretilted liquid crystal molecules in the mask 20 whose alignment varies according to an electric field may correspond to pretilted liquid crystal molecules in the display panel 100. The mask 20 may control the voltage applied to each of the first electrodes E1 and the voltage applied to each of the second electrodes E2 in consideration of pretilt information regarding the liquid crystal molecules LC of the liquid crystal layer 102. The pretilt information may be data set in consideration of the cell gap variations in the display panel 100 resulting from the bending of the display panel 100 with a predetermined curvature radius. The alignment of the liquid crystal molecules in the mask 20 may be controlled in consideration of the amount of UV light to be applied to each part of the display panel 100. More specifically, as illustrated in FIG. 9, the alignment of the liquid crystal molecules in the mask 20 may be controlled such that a small amount of UV light may be applied to a central portion CA and end portions EA of the display panel 100, and that a large amount of UV light may be applied to middle portions MA arranged between the central and the end portions CA and EA of the display panel 100. The liquid crystal molecules LC of the display panel 100 may be pretilted according to the amount of UV light applied thereto through the mask 20.

The mask 20 may control the electric field at each of the intersections between the first electrodes E1 and the second electrodes E2 to control the amount of light transmitted through the mask 20. Accordingly, different parts of the display panel 100 may be provided with different amounts of UV light, and thus, the liquid crystal molecules LC in the display panel 100 may be pretilted at different angles in different areas of the display panel 100.

A manufacturing method of an LCD device according to an exemplary embodiment of the present invention will hereinafter be described.

Figure 10:
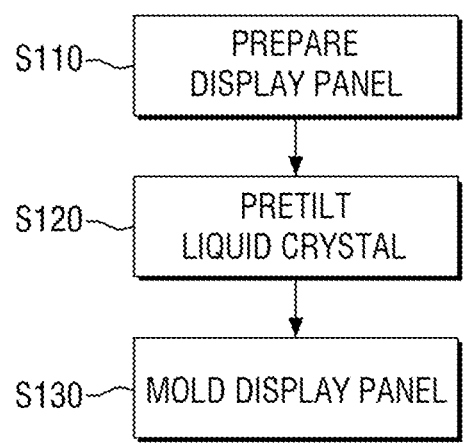
FIG. 10 is a flowchart illustrating a manufacturing method of an LCD device, according to an exemplary embodiment of the present invention.
Figure 11:
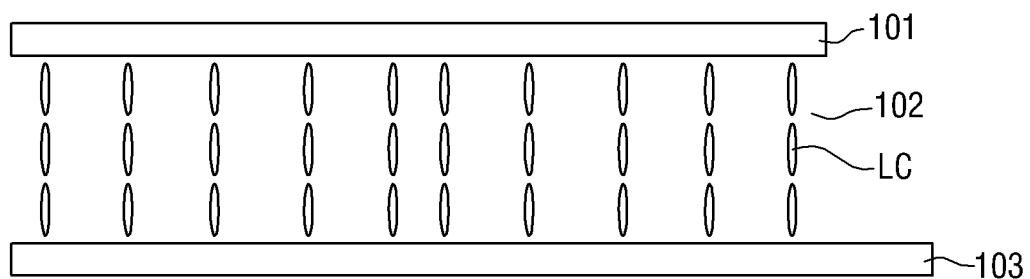
FIGS. 11 to 13 are cross-sectional views illustrating the manufacturing method of the LCD device illustrated in FIG. 10.
Figure 12:
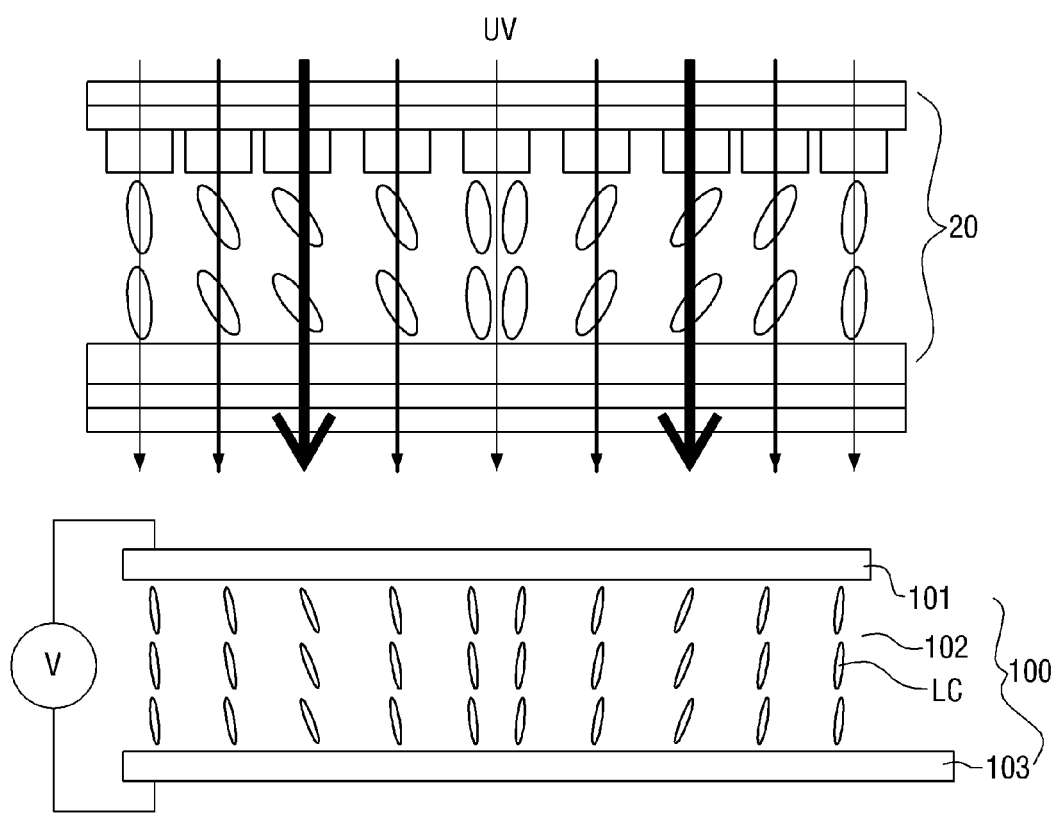
Figure 13:
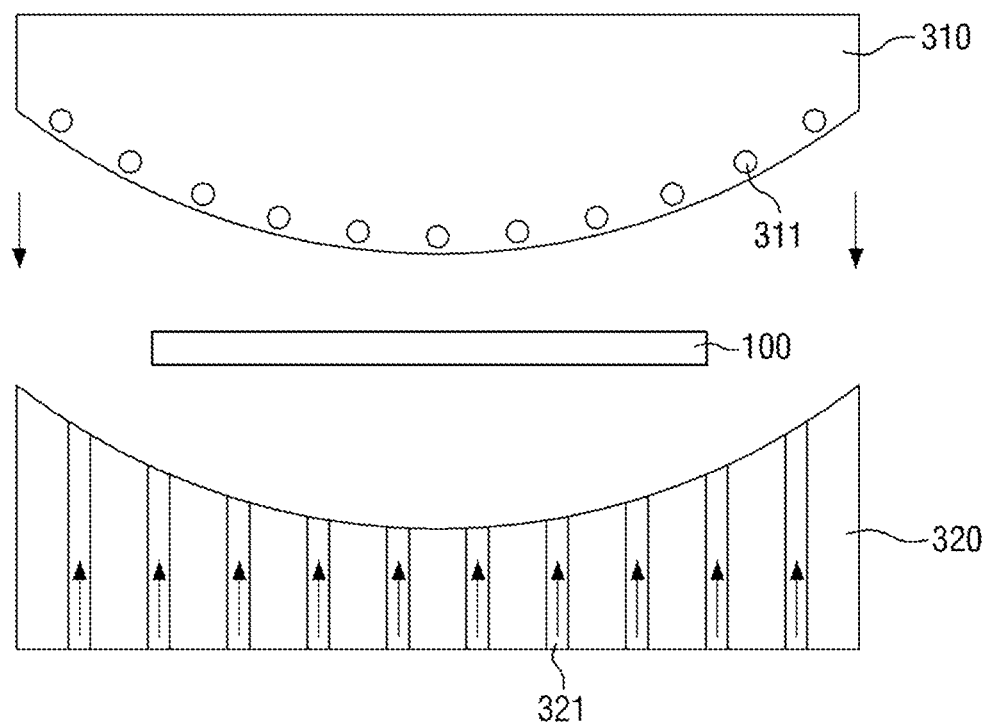

FIG. 10 is a flowchart illustrating a manufacturing method of an LCD device according to an exemplary embodiment of the present invention, and FIGS. 11 to 13 are cross-sectional views illustrating the manufacturing method of an LCD device illustrated in FIG. 10.

Referring to FIGS. 10 to 13, the manufacturing method according to an exemplary embodiment of the present invention includes preparing a display panel (S110), pretilting liquid crystal molecules (S120), and molding the display panel (S130).

In step S110, a display panel 100 is prepared (S110).

The display panel 100 may be an LCD panel. More particularly, the display panel 100 may include a transparent first substrate 101 and a transparent second substrate 103, a liquid crystal layer 102 interposed between the first and second substrates 101 and 103, and a sealing member 104 coupling the first and second substrates 101 and 103 together. The first substrate 101 may be an encapsulation substrate, and the second substrate 103 may be an array substrate. Other elements of the display panel 100 may substantially be the same as their respective counterparts of the display panel 100 illustrated of FIG. 1, FIG. 2, and FIG. 5, and therefore, repeated descriptions thereof will be omitted. The first and second substrates 101 and 103 may be formed separately, and arranged to face each other. The first substrate 101 may be bonded to the second substrate 103 by curing the sealing member 104. The liquid crystal layer 102 may be interposed between the first and second substrates 101 and 103 through, for example, vacuum injection. The liquid crystal layer 102 may include liquid crystal molecules LC and an alignment adjuvant. The alignment adjuvant may include a UV curable monomer. The liquid crystal layer 102 may also include a dopant to adjust the pitch between the liquid crystal molecules LC.

The second substrate 103 may extend longer than the first substrate 101 in a horizontal direction. More particularly, part of the second substrate 103 may not be bonded to the first substrate 101. Part of the second substrate 103 bonded to the first substrate 101 may become a display area, and part of the second substrate 103 not bonded to the first substrate 101 may become a mounting area. In the mounting area of the second substrate 103, an integrated circuit (IC) chip and a flexible printed circuit board (FPCB) for driving pixels in the display area of the second substrate 103 may be provided. The IC chip and the FPCB may be arranged in step S110 of the preparation of the display panel 100. Alternatively, the IC chip and the FPCB may be arranged after the molding of the display panel 100 into a curved shape.

In step S120, liquid crystal molecules are pretilted.

As illustrated in FIG. 12, a pretilt voltage V may be supplied to the first and second substrates 101 and 103. UV light may be applied to the first and second substrates 101 and 103 while supplying the pretilt voltage V to the first and second substrates 101 and 103. The application of UV light to the first and second substrates 101 and 103 may be performed after the injection of the liquid crystal layer 102. The level of the pretilt voltage V may gradually increase over time. To prevent an afterimage that may be caused by an uncured UV curable monomer in the liquid crystal layer 102 due to color filters (not illustrated) absorbing UV light, UV light may be applied through a substrate where no color filters are formed. More particularly, UV light may be applied through the top of the first substrate 101 or the bottom of the second substrate 103. In response to UV light being applied to the display panel 100 with the pretilt voltage V supplied to the display panel 100, the UV curable monomer in the liquid crystal layer 102 may be cured, and as a result, the liquid crystal molecules LC may be pretilted. Since the liquid crystal molecules LC may be pretilted by the UV curable monomer, the random motion of the liquid crystal molecules LC during the application of power to the display panel 100 may be prevented, and as a result, the response speed of the LCD device 10 may be improved. Accordingly, the occurrence of an afterimage may be reduced. The LCD device 10 may be a curved LCD device, and the display panel 100 may be bent to have a predetermined curvature. In response to the display panel 100 being bent, the gap between the first and second substrates 101 and 103 may vary from one area to another area in the display panel 100. The step S120 of pretilting the liquid crystal molecules LC may include pretilting the liquid crystal molecules at different angles for different cell gaps in the display panel 100. In particular, the liquid crystal molecules LC may be pretilted according to the gap between the first and second substrates 101 and 103. More specifically, the liquid crystal molecules LC may be pretilted in proportion to the gap between the first and second substrates 101 and 103, which overlap the liquid crystal molecules LC. The liquid crystal molecules LC may be pretilted at a large angle in an area where a large cell gap is formed, and at a small angle in an area where a narrow cell gap is formed. The pretilt angle of the liquid crystal molecules LC may indicate the degree to which the liquid crystal molecules LC are tilted with respect to a vertical axis. The degree to which the liquid crystal molecules LC are pretilted may vary according to the amount of UV light applied. UV light may be provided via a mask 20, and the mask 20 may apply different amounts of UV light to different areas of the display panel 100. The mask 20 may be the mask 20 illustrated in FIGS. 6 to 9. More particularly, the UV light may be selectively applied to the display panel 100 through the mask 20 according to the cell gap of the display panel 100, and the pretilt angle of the liquid crystal molecules LC may be set to differ for different cell gaps in the display panel 100.

In step S130, a display panel is molded.

The display panel 100 may be molded into a curved shape with a predetermined curvature radius. One or more fixing members may be attached onto the display panel 100 to suppress the display panel 100 from being unbent. The fixing members may fix both ends of the first and second substrates 101 and 103 such that the relative locations of the first and second substrate 101 and 103 may not be changed. The fixing members may be formed of a transparent resin such as polymethyl methacrylate (PMMA), and may be attached onto the first substrate 101. More particularly, the transparent resin may bend the display panel 100 at low temperature, and suppress the bent display panel 100 from being unbent. The transparent resin disposed at the front of the display panel 100 may serve as a protective layer for protecting the display panel 100 from external impact. The display panel 100 with the fixing members coupled thereto may be loaded in a molding apparatus, and molded into a curved shape with the predetermined curvature.

As illustrated in FIG. 13, the molding apparatus may include an upper jig 310 and a lower jig 320. According to an exemplary embodiment of the present invention, the molding apparatus may include two rollers on which the display panel 100 may be inserted to form a curved shape. The display panel 100 may be loaded or unloaded between the upper and lower jigs 310 and 320. The upper jig 310 may be opened or closed from the lower jig 320. A seating surface for the display panel 100 may be respectively formed at the bottom of the upper jig 310 and the top of the lower jig 320, as a curved surface with the predetermined curvature. Heaters 311 for heating the display panel 100 may be embedded in the upper jig 310. The heaters 311 may be implemented in various types of products, such as hot-wire coils or tubes through which a high-temperature gas or fluid may flow and apply heat to the display panel 100 during the bending of the display panel 100 into a curved shape. Blast pipes 321 may be installed in the lower jig 320 to dissipate heat from the display panel 100. The blast pipes 321 may be formed through the lower jig 320 to extend from the seating surface of the lower jig 320 to the outside of the molding apparatus. A cold air may be supplied into the blast pipes 321. During the step S130 of molding the display panel 100 into a curved shape, the display panel 100 may be loaded on the seating surface of the lower jig 320 with the upper jig 310 opened from the lower jig 320. Thereafter, the upper jig 310 may be gradually lowered while being heated by the heaters 311 and bend the display panel 100. The heat in the display panel 100 may be dissipated through the blast pipes 321 of the lower jig 320. The bent display panel 100 may be unloaded from the molding apparatus after being sufficiently subjected to heat dissipation through the blast pipes 321.

Once molded into a curved shape, the display panel 100 may be assembled into a single module together with a curved surface light source-reinforcing member, a curved surface light source unit and other fixing members.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method of manufacturing a liquid crystal display (LCD) device, the method comprising:
    preparing a display panel comprising a first substrate, a second substrate facing the first substrate, and a liquid crystal layer interposed between the first and second substrates;
    pretilting liquid crystal molecules in the liquid crystal layer; and
    molding the display panel into a curved shape having a first curvature,
    wherein:
    the display panel comprises a first region in which the display panel has a first cell gap and a second region in which the display panel has a second cell gap different from the first cell gap; and
    the liquid crystal molecules in the first region have a first pretilt angle and the liquid crystal molecules in the second region have a second pretilt angle different from the first pretilt angle.

2. The method of claim 1, wherein the liquid crystal layer comprises an ultraviolet (UV)-curable monomer, the ultraviolet (UV)-curable monomer being cured to pretilt the liquid crystal molecules by applying UV light from an external source.

3. The method of claim 2, wherein pretilting the liquid crystal molecules comprises:
    applying a pretilt voltage to the display panel;
    disposing a mask over the display panel; and
    selectively applying UV light to the display panel from above the mask by controlling the amount of UV light transmitted through portions of the mask.

4. The method of claim 3, wherein the amount of UV light transmitted through each portion of the mask is controlled by adjusting an electric field applied in each portion of the mask.

5. The method of claim 1, wherein an inclination angle of the liquid crystal molecules is proportional to the gap interposed between the first and second substrates that overlaps the liquid crystal layer.

6. The method of claim 1, wherein the preparing the display panel comprises:
    bonding the first substrate to the second substrate using a sealing member; and
    injecting the liquid crystal layer between the first and second substrates.

7. The method of claim 1, wherein molding the display panel comprises:
    loading the display panel on a seating surface of a lower jig having the first curvature; and
    bending the display panel using a bottom surface of an upper jig having the first curvature.

8. The method of claim 7, wherein:
the upper jig comprises at least one heater for heating the display panel; and
the lower jig comprises at least one blast pipe for dissipating heat from the display panel.

9. A liquid crystal display (LCD) device mask, comprising:
a first substrate;
a second substrate facing the first substrate and configured to transmit ultra-violet (UV) light incident to a display panel; and
a liquid crystal layer comprising liquid crystal molecules interposed between the first and second substrates,
wherein:
the display panel is bent to have a first curvature, a first area, and a second area;
the second substrate of the mask is configured to transmit a first amount of UV light and a second amount of UV light to pretilt the liquid crystal molecules in the first and second areas of the display panel, respectively; and
the first area comprises a first cell gap and the second area comprises a second cell gap different from the first cell gap due to bending the display panel.

10. The mask of claim 9, further comprising:
first electrodes disposed on a first surface of the first substrate; and
second electrodes disposed on a second surface of the second substrate to face the first electrodes,
wherein:
the first electrodes extend in a first direction and the second electrodes extend in a second direction intersecting the first direction; and
an alignment of liquid crystal molecules in the liquid crystal layer is configured to vary according to a voltage at each intersection of the first electrodes and the second electrodes.

11. The mask of claim 10, wherein the amount of light incident upon the first substrate and emitted through the second substrate is configured to vary according to a voltage of the first electrodes and a voltage of the second electrodes.

12. The mask of claim 11, wherein
the liquid crystal molecules of the display panel are configured to be pretilted according to the amount of UV light applied to the display panel.

13. The mask of claim 9, further comprising:
a first polarizing plate disposed on a second surface of the first substrate; and
a second polarizing plate disposed on a first surface of the second substrate,
wherein a transmission axis of the first polarizing plate is opposite to a transmission axis of the second polarizing plate.

14. A liquid crystal display (LCD) device, comprising:
a first substrate;
a second substrate facing the first substrate; and
a liquid crystal layer interposed between the first and second substrates and comprising liquid crystal molecules,
wherein:
the display panel comprises a first region in which the display panel has a first cell gap and a second region in which the display panel has a second cell gap different from the first cell gap; and
the liquid crystal molecules in the first region have a first pretilt angle and the liquid crystal molecules in the second region have a second pretilt angle different from the first pretilt angle.

15. The LCD device of claim 14, wherein an inclination angle of the liquid crystal molecules are proportional to the cell gap between the first and second substrates that overlap the liquid crystal layer.

16. The LCD device of claim 14, wherein an inclination angle of the liquid crystal molecules with respect to a vertical axis increases as the cell gap between the first and second substrates that overlaps the liquid crystal layer increases.

17. The LCD device of claim 14, wherein the first substrate is disposed on an inside of the center of a radius of curvature thereof.

18. The LCD device of claim 14, further comprising a light source unit bent to have the same radius of curvature as the second substrate and configured to emit light toward the second substrate.

19. The LCD device of claim 18, further comprising a light source reinforcing member bent to have the same radius of curvature as the second substrate and disposed between the light source unit and the second substrate.

* * * * *